(12) United States Patent
Matsumoto et al.

(10) Patent No.: US 6,827,499 B2
(45) Date of Patent: Dec. 7, 2004

(54) METHOD OF MANUFACTURING TWO-DIMENSIONAL OPTICAL CONNECTOR COMPONENT

(75) Inventors: Akira Matsumoto, Nagoya (JP); Masashi Fukuyama, Inuyama (JP); Akiyoshi Ide, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 38 days.

(21) Appl. No.: 10/190,905

(22) Filed: Jul. 8, 2002

(65) Prior Publication Data

US 2003/0012516 A1 Jan. 16, 2003

Related U.S. Application Data

(60) Provisional application No. 60/305,166, filed on Jul. 13, 2001.

(30) Foreign Application Priority Data

May 21, 2002 (JP) ........................................ 2002-145735

(51) Int. Cl.[7] ................................................. G02B 6/38
(52) U.S. Cl. ........................................................ 385/71
(58) Field of Search ............................................ 385/71

(56) References Cited

U.S. PATENT DOCUMENTS

| | | | |
|---|---|---|---|
| 4,046,454 A | | 9/1977 | Pugh, III |
| 5,379,361 A | * | 1/1995 | Maekawa et al. ............. 385/65 |
| 5,555,332 A | * | 9/1996 | Dean et al. ................... 385/53 |
| 5,600,747 A | * | 2/1997 | Yamakawa et al. ........... 385/59 |
| 5,600,748 A | * | 2/1997 | Kosaka ......................... 385/59 |
| 5,689,598 A | * | 11/1997 | Dean et al. ................... 385/59 |
| 5,689,599 A | | 11/1997 | Shahid |
| 5,838,856 A | * | 11/1998 | Lee .............................. 385/54 |

FOREIGN PATENT DOCUMENTS

JP          6-265736        9/1994

OTHER PUBLICATIONS

Patent Abstracts of Japan, Publication No. 09–019808 (Jan. 23, 1990), Application No. 63–169549 (Jul. 7, 1988), in the name of Nippon Telegr & Teleph Corp., (abstract).

* cited by examiner

*Primary Examiner*—Mark Tremblay
(74) *Attorney, Agent, or Firm*—Burr & Brown

(57) ABSTRACT

To provide a method of manufacturing a two-dimensional optical connector component by stacking a plural number of one-dimensional optical connector components using at least four parallel disposed guide pins. The positions of the guide pins are determined by at least five pieces of beams. According to this method of manufacturing a two-dimensional optical connector component, optical connector components, such as an FA, can be stacked with high precision. There is also provided a guide pin jig usable for the above-mentioned manufacturing method. The jig is provided with at least four pieces of parallel disposed guide pins, and at least five pieces of beams for determining the position of the guide pins.

13 Claims, 7 Drawing Sheets

METHOD OF MANUFACTURING TWO-DIMENSIONAL OPTICAL CONNECTOR COMPONENT

This application claims the benefit of U.S. Provisional Application Ser. No. 60/305,166 filed Jul. 13, 2001 and Japanese Application No. 2002-145735, filed May 21, 2002, the entireties of which are incorporated herein by reference.

BACKGROUND OF THE INVENTION AND RELATED ART STATEMENT

The present invention relates to a method of manufacturing an optical connector typified by an optical fiber array, a lens array and the like. Specifically, this invention relates to a method of manufacturing a two-dimensional optical connector component comprising various one-dimensional optical connector components being usable for optical fiber communications by positioning them with a plural number of guide pins, and then stacking them precisely.

In an optical device, an optical fiber array or other various optical connectors are used for coupling a waveguide with an optical fiber, or an optical fiber with another. The optical connector has one or more precision V-shaped grooves with the respective optical fibers aligned and fixed therein. A material for a substrate may be ceramic, glass or ceramic glass. Precision patterning is accomplished by grinding or glass pressing. Recently, the variety of switching technique or the like has been increased, and accordingly, the optical connectors have become variously configured. For example, optical fibers are aligned two-dimensionally.

In the past, various basic configurations of two-dimensional optical fiber array (referred to as a 2DFA occasionally hereinafter) have been proposed. For example, there has been known (1) a 2DFA comprising a ferrule of two-dimensional array type, (2) a 2DFA comprising a stack of V-shaped grooved substrates, (3) a 2DFA comprising a stack of one-dimensional optical fiber array (sometimes hereinafter referred to as a FA) to assure a desired number of channels and the like. However, these have problems as described below.

Problem with the Two-dimensional Array Ferrule

In the case where the two-dimensional array ferrule serves as the 2DFA, as disclosed in Japanese Patent Laid-Open No. 2-19808, a high precision is attained, although the number of cores of the ferrule is limited. However, if the ferrule includes 8- by 10- cores, for example, eighty optical fibers have to be implemented on the ferrule one by one. A hole, to which the optical fiber is to be inserted, has a clearance of only several $\mu$m from the optical fiber for assuring precision. Therefore, the optical fiber may be readily cut depending on how it is handled, and thus reliability is low. Problem with the stack of v-shaped grooved substrates.

When stacking V-shaped grooved substrates to form a 2DFA, means for aligning the V-shaped grooves on the respective substrates is the most difficult problem. As an example, there is contemplated a method of forming V-shaped grooves in the respective substrates with reference to end faces thereof, and then stacking the V-shaped grooved substrates with reference to the end faces.

As shown in FIG. 8, a lowermost V-shaped grooved substrate 2 is placed abutting against a side face of an end plate 81, for example, and then, an optical fiber 8 is placed in a V-shaped groove 7. Then, a second lowest V-shaped groove substrate 2 is placed on the lowermost one, and an adhesive is applied thereon and cured. This procedure is repeated to form a two-dimensional optical fiber array 80.

According to this method, however, it is difficult to assure high precision in machining the V-shaped grooves with reference to the end faces, and thus, precision of lateral positions thereof cannot be assured. In addition, in a stacking direction, errors in thickness of the V-shaped grooved substrates are accumulated as the substrates are stacked. Therefore, a high-precision 2DFA cannot be fabricated. Additionally, since the optical fibers are implemented on the V-shaped grooved substrates while stacking of the substrates, a failure, such as cutting of the fiber, can easily result.

Another possible method of stacking the V-shaped grooved substrates to form a 2DFA is to form V-shaped grooves on both upward and downward surfaces of the substrate with aligned with each other, and implement the optical fibers thereon and stack the substrates with reference to the grooves.

As shown in FIG. 9, a plurality of V-shaped grooved substrates 94 with V-shaped grooves 7 formed on both surfaces thereof are prepared, and the optical fibers 8 are placed in the V-shaped grooves 7 of the lowermost V-shaped grooved substrate 94. Then, the second lowest V-shaped grooved substrate 94 is placed on the lowermost one, and an adhesive is applied thereon and cured. This procedure is repeated to form a two-dimensional optical fiber array 90.

According to this method also, however, errors in thickness of the substrates are accumulated, and the optical fibers are implemented on the substrates while stacking the substrates. Thus, the reliability is readily decreased.

Problem with the Stack of FAs

According to the method wherein a 2DFA is formed by stacking FAs, a failure resulting from cutting of the optical fiber can be avoided because the FAs are previously fabricated. However, simply stacking the FAs cannot avoid the problem of the stacking error resulted from the thicknesses of the substrates. Thus, a means is required for fabricating the 2DFA without the stacking error in the method of stacking the FAs to form a 2DFA.

The two-dimensional alignment of a 2DFA having high reliability may be achieved by manufacturing a 2DFA by stacking FAs quite precisely so as to not make positional deviation. However, such a method has not been provided in the past.

Therefore, an object of the present invention is to provide a method of manufacturing a two-dimensional optical connector component capable of stacking a plural number of one-dimensional optical connector components, such as a FA, with high precision, thereby contributing to further construction and increased use of an optical transmission system and to development of an information society.

SUMMARY OF THE INVENTION

In order to attain the above object, the inventors have investigated various methods for precisely stacking optical connector components, such as a FA. As a result, the inventors have found that the above object can be attained by measures as described below.

According to the present invention, there is provided a method of manufacturing a two-dimensional optical connector component comprising a plural number of FAs stacked by using at least four parallel disposed guide pins, characterized in that said at least four parallel disposed guide pins are positioned by at least five pieces of beams. A one-dimensional optical connector component itself may be used as a substitute for two pieces of beams among said at least five pieces of beams.

A two-dimensional optical connector component may be manufactured by a method, which may include a step of positioning a plural number of one-dimensional optical connector components by using at least four pieces of parallel disposed guide pins. In the case where a one-dimensional optical connector component itself is used as a substitute for two pieces of beams among at least five pieces of beams, the position of the guide pins is determined by the one-dimensional optical connector component. Consequently, the one-dimensional optical connector component itself takes a role in the determination for the positioning of the one-dimensional optical connector component to be stacked.

In the above-described method of manufacturing a two-dimensional optical connector component, the positioning of the one-dimensional optical connector component refers to positioning in a direction of stacking the one-dimensional optical connector components.

In the method of manufacturing a two-dimensional optical connector component according to this invention, the two-dimensional optical connector component may be one comprising an optical medium having a substantially cylindrical shape mounted thereon, or one comprising an optical medium having a substantially cylindrical shape mounted thereon and having a guide groove for fixing the guide pin formed thereon. One example is a two-dimensional optical fiber array.

In the method of manufacturing a two-dimensional optical connector component according to this invention, in the case that a one-dimensional optical connector component itself is not used as a substitute for two pieces of beams among five pieces of beams, a guide pin jig may be used comprising at least five pieces of beams and at least four parallel disposed guide pins. In this guide pin jig, the beams comprise two pieces of vertical beam members and two pieces of transverse beam members which form a parallel cross, and two pieces of diagonal beam members provided diagonally across the parallel cross and the two pieces of vertical beam members at the minimum. A plurality of guide pins is provided at desired positions of each of the two pieces of vertical beam members. A two-dimensional optical connector component may be manufactured by a method which comprises: preparing a plurality of optical connector components each having guide grooves for fixing the guide pins at both ends thereof, inserting a first one-dimensional optical connector component into the guide pin jig so that the guide grooves are brought into contact with the respective first guide pins provided on the two vertical beam members and making the guide grooves and the guide pins contact intimately with each other under giving a load thereto; inserting a second one-dimensional optical connector component into the guide pin jigs so that the guide grooves are brought into contact with the respective second guide pins provided on the two pieces of vertical beam members and bringing the guide grooves and the guide pins into intimate contact with each other under giving a load thereto; injecting an adhesive into a space between the first one-dimensional optical connector component and the second one-dimensional optical connector component and curing the adhesive, and then repeating the last two steps until the necessary numbers of one-dimensional optical connector components are stacked.

As a method for applying a load, one may employ a method of applying a load in a direction of gravitation to the one-dimensional optical component being contact intimately with the guide pin, or a method of applying a load by pinching the guide pin and a one-dimensional optical component being contact intimately with the guide pin. In the case that a load is applied by pinching the guide pin and a one-dimensional optical components being contact intimately with the guide pin, it is preferable to use a flexible jig having a double-pointed tack like shape.

Moreover, it is preferable that an ultraviolet curing adhesive is poured into a space between a first one-dimensional optical connector component and a one-dimensional second optical connector component and curing the adhesive with an ultraviolet ray applied to an optical medium, wherein the said one-dimensional optical components are disposed with said optical medium having a substantially cylindrical shape between the guide grooves at both ends, and the adhesive used therefore is an ultraviolet curing adhesive. It is preferable to pour the adhesive into a region except for the guide grooves. This is because the guide pins are undesirably fixed if the adhesive flows into the guide grooves.

According to this invention, there is provided a guide pin jig usable for manufacturing a two-dimensional optical connector component by stacking a plurality of one-dimensional optical connector components. The jig is comprised of at least four parallel disposed guide pins and at least five beams members, in which the guide pins are positioned by the five beams members.

According to this invention, there is also provided a double-pointed tack shaped guide pin jig usable for manufacturing a two-dimensional optical connector component by stacking a plurality of one-dimensional optical connector components. The jig has an upper jaw and a lower jaw and a double-pointed tack like shape in at least one cross section thereof. The upper jaw and lower jaw are made of an elastic body. One-dimensional optical connector components and guide pins are fixed in the guide grooves and are able to be positioned between the upper and lower jaws.

BRIEF DESCRIPTION OF THE DRAWINGS

FIGS. 1(a) and 1(b) show one embodiment of a guide pin jig used in a method of manufacturing a two-dimensional optical connector component according to this invention, in which FIG. 1(a) is a front view thereof, and FIG. 1(b) is a side view thereof.

FIGS. 2(a) and 2(b) illustrate one embodiment the method of manufacturing a two-dimensional optical connector component according to this invention, in which FIG. 2(a) is a front view, and FIG. 2(b) is a side view.

FIG. 13(a) is a front view.

FIG. 14(a) is a front view.

FIG. 15(a) is a front view of the stack-layered optical connector component and FIG. 15(b) is a front view of a single optical connector component.

FIG. 16(a) is a front view of the stack-layered optical connector component and FIG. 16(b) is a front view of a single optical connector component.

DETAILED DESCRIPTION OF THE INVENTION

Embodiments of a method of manufacturing a two-dimensional optical connector component according to this invention will be described in detail below. However, this invention should not be construed to be limited thereto, and those skilled in the art can, with their own knowledge, make various changes, modifications and alterations without departing from the scope of this invention.

This invention relates to a method of manufacturing a two-dimensional optical connector component comprising a plural number of one-dimensional optical connector components stacked in high precision, which includes first and second manufacturing methods.

The first manufacturing method according to this invention is directed to a method wherein a guide pin jig is assembled with high precision, and optical connector components, FAs, for example are stacked by using the jig as an absolute reference for stacking. Here, each of at least four guide pins included in the guide pin jig is positioned at a pin-stand point with at least five beams.

Since the method involves assembling the guide pin jig by positioning the guide pins with at least five beams, and stacking the optical connector components while positioning the same with the guide pin jig, stacking the one-dimensional pin jig optical connector components is only needed once the guide pin jig has been fabricated, and thus, the process may reduce labor time required for stacking. On the other hand, it is required to prepare a guide pin jig in accordance with each specification.

Figure 1A:
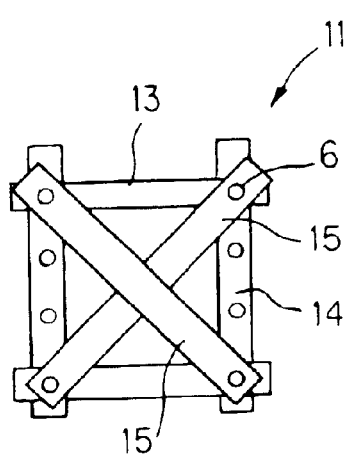
Figure 1B:
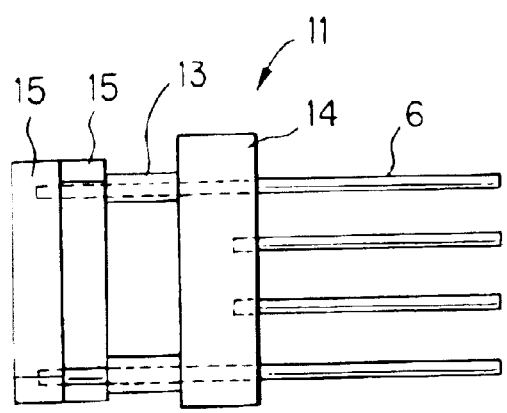

FIGS. 1(a) and 1(b) show one embodiment of the guide pin jig used in the first manufacturing method, in which FIG. 1(a) is a front view thereof, and FIG. 1(b) is a side view thereof. A guide pin jig 11 comprises two vertical beam members 14 and two transverse beam members 13, which are configured in a parallel cross, and two diagonal beam members 15 provided diagonally across the parallel cross.

The guide pin jig is preferably composed of six beam members, as shown as the guide pin jig 11 in FIGS. 1(a) and 1(b). However, it may be composed of five beam members including at least two vertical beam members having the guide pins. Five or more beam members allow the pin-stand points to be determined precisely. The guide pin jig 11 comprises a plurality of guide pins 6 provided at respective desired pin-stand points on the two vertical beam members. In order to stack the optical connector components while positioning the same, each of the guide pins 6 needs to be provided perpendicular to the beam members of the guide pin jig 11 and parallel to the other guide pins 6, as shown in FIG. 1(b). It is more preferable to dispose traverse beam members 13 before vertical beam members 14 when the preciseness of the pitches in the traverse direction might be expected due to the deflection of guide pins.

The second manufacturing method according to this invention is to stack one-dimensional optical connector components while positioning the guide pins with four pieces of beam members and two pieces of one-dimensional optical connector components. In this case, since the one-dimensional optical connector components themselves serve as two of the six beams for positioning, the number of parts can be reduced compared with the first manufacturing method. However, unlike the first manufacturing method, positioning is not accomplished by the assembled guide pin jig. Thus, the guide pin jig has to be set each time stacking one component on another.

In the second manufacturing method, the one-dimensional optical connector components are stacked while putting together the vertical beam members, the diagonal beam members, the guide pins, and the one-dimensional optical connector components themselves serving as the transverse beam members, rather than previously assembling the guide pin jig.

Figure 2A:
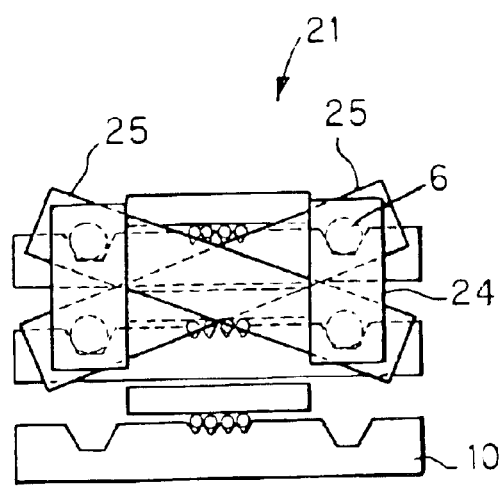
Figure 2B:
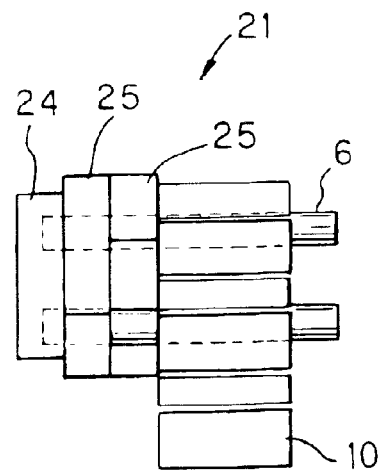

FIGS. 2(a) and 2(b) illustrate one embodiment of the second manufacturing method, in which FIG. 2(a) is a front view, and FIG. 2(b) is a side view. A guide pin jig 21 comprises two vertical beam members 24, which constitute two sides of a parallel cross, and two diagonal beam members 25 provided diagonally across the parallel cross. Furthermore, the guide pin jig 21 comprises at least four guide pins 6 provided at pin-stand points where the two vertical beam members 24 and the two diagonal beam members 25 intersect with each other. In order to stack a plural number of one-dimensional optical connector components while positioning the same, each of the guide pins 6 needs to be provided perpendicular to each of the beam members of the guide pin jig 21 and parallel to the other guide pins 6, as shown in FIG. 2(b).

The four beams of the guide pin jig 21 are insufficient to position the guide pins 6. Positioning of the guide pins 6 can be accomplished after determining the lateral positions of the guide pins with two one-dimensional optical fiber arrays (FA) 10, rather than jigs, the one-dimensional optical fiber array being one example of the optical connector component and serving as the transverse beam. Specifically, the guide pins 6 are brought into contact with guide grooves on the FAs 10, whereby the positions thereof are determined. Thus, the position of the stacked optical connector component, that is, the FA is also determined.

Figure 15A:
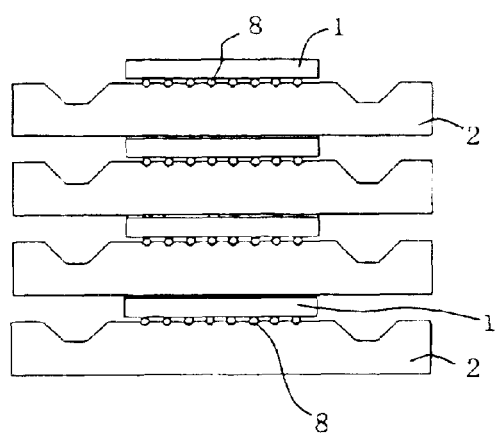
FIGS. 15(a) and (b) are exemplary views of a one-dimensional optical connector component according to this invention.
Figure 15B:
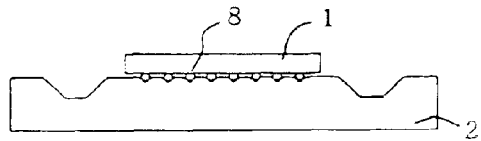
Figure 16A:
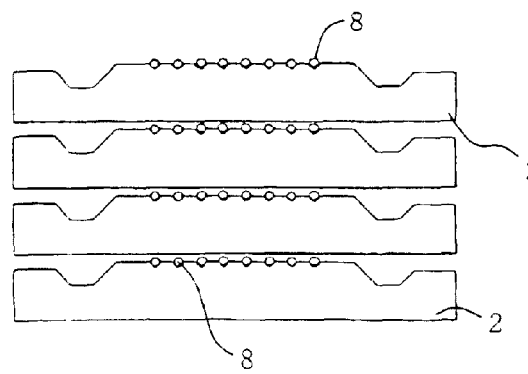
FIGS. 16(a) and (b) are another exemplary views of a one-dimensional optical connector component according to this invention.
Figure 16B:
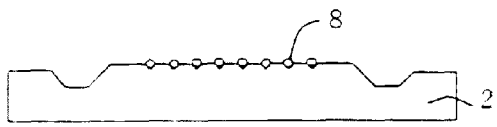

Additionally, as an structural embodiment of a one-dimensional optical connector component, one may take up the case that a substrate for pressing each of optical media such as an optical fiber is present as an upper lid substrate, as shown in FIGS. 15(a) and (b), and the case that no such a substrate is present, as shown in FIGS. 16(a) and (b). The former is preferable, especially for the case that a high reliability of devices is required for a long period of services even if some movement of the optical connector component is expected during such long services. The latter may be used for such a case, for example, that the pitches of stacking in the stacking direction are shortened, the adverse effects derived from adhesives used for stacking is reduced, or the like.

In the first and second methods of manufacturing a two-dimensional optical connector component according to this invention ("first and second" may be omitted occasionally hereinafter), the guide pin jig is constructed by combining the V-shaped grooved substrates together three-dimensionally. Thus, a super-high precision of the order of ±0.5 µm can be attained with respect to the position of the pin-stand point. To set up the guide pins on each of the beam members, a method of fixing the guide pins by making holes in said beam members and inserting the guide pins into the holes may be adopted. In this case, however, the hole has to have a clearance for insertion of the guide pin, and the pin-stand cannot be fabricated with a precision of the order of ±0.5 µm.

The method of manufacturing a two-dimensional optical connector component according to this invention will be described below with reference to examples. However, this invention is not limited to the examples.

Taking the FA as an example of the optical connector, a 2DFA of a FA stack type was fabricated using the guide pin jig.

EXAMPLE

Figure 10:
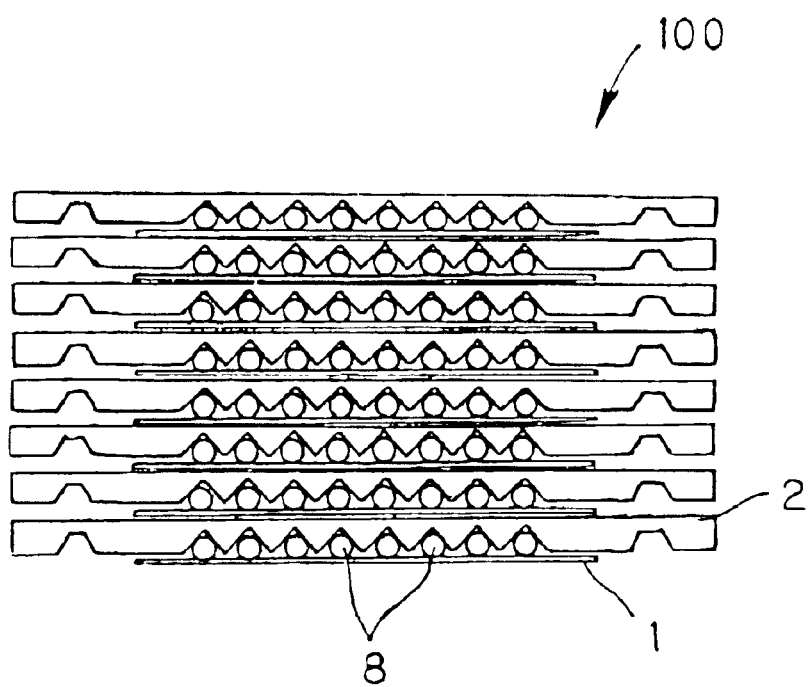
FIG. 10 is a cross-sectional view of an exemplary optical fiber array according to this invention.

A two-dimensional optical fiber array as shown in FIG. 10 was fabricated using the guide pin jig with six beams. According to specifications of the 2DFA 100, vertical and transverse fiber pitches thereof were 1.5 mm, and the 2DFA had 8- by 8- channels.

Figure 3:
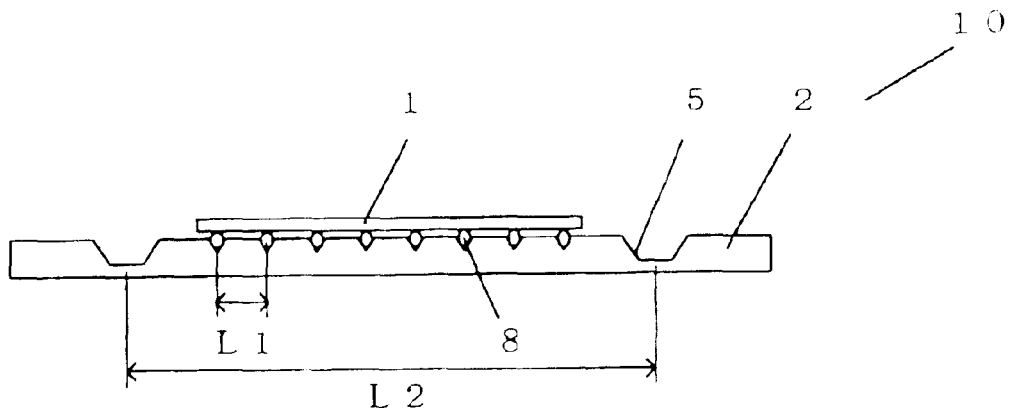
FIG. 3 is a cross-sectional view of an exemplary optical fiber array.

An FA to be stacked is shown in FIG. 3. An FA 10 comprises a V-shaped grooved substrate 2 and an upper lid substrate 1. On the V-shaped grooved substrate 2 having a thickness of 0.71 mm, which is made of borosilicate glass, eight V-shaped grooves were formed by grinding with a pitch L1 of 1.5 mm, and guide grooves 5 were formed on both sides of the V-shaped grooves with a pitch L2 of 14.5 mm. Optical fibers 8 having a diameter of 0.125 mm were mounted in the V-shaped grooves 2, held down by the upper lid substrate 1 having a thickness of 0.51 mm, and fixed with an adhesive.

Figure 4:
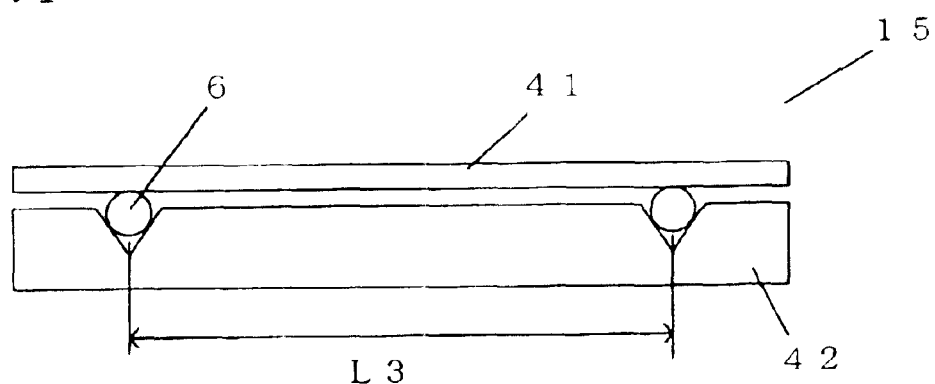
FIG. 4 shows one embodiment of a diagonal beam jig constituting a guide pin jig used in the method of manufacturing a two-dimensional optical connector component according to this invention.

The guide pin jig was made of zirconia. The guide pin jig was composed of two vertical beam members (FIG. 5), on which the guide pins are provided, two transverse beam members (not shown), and two diagonal beam members (FIG. 4). The guide pin jig was also composed of a V-shaped grooved substrate and an upper lid substrate for fixing the V-shaped grooved substrate. The guide pin used was a zirconia pin having a diameter of 0.7 mm.

Details of the guide pin jig are as follows.

A pin-stand pitch L3 of diagonal beam members 15 shown in FIG. 4 was 17.902 mm, because it is equivalent to a diagonal line across a rectangle having a longitudinal side of 14.5 mm, which is equivalent to the above-described pitch L2, and a lateral side of 1.5 mm×7=10.5 mm, which is a sum of pitches L4 described later. A V-shaped grooved substrate 42 had two V-shaped grooves formed with this pitch L3. The V-shaped grooves, the guide pins 6 and an upper lid substrate 41 were assembled, brought into contact with each other, adhered and fixed.

The transverse beam members had two V-shaped grooves formed with a pitch of 14.5 mm so as to be equal to the pitch L2 of the guide grooves 5 of the FA 10. This assures a three-point contact involving the V-shaped grooved substrate, the guide pin and the upper lid substrate.

Figure 5:
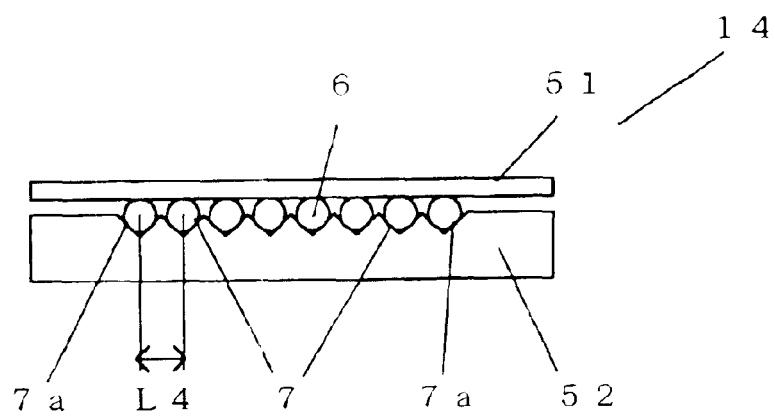
FIG. 5 shows one embodiment of a vertical beam jig constituting a guide pin jig used in the method of manufacturing a two-dimensional optical connector component according to this invention.

On the vertical beam members 14 shown in FIG. 5, eight V-shaped grooves for supporting the guide pins 6 were formed with the pitch L4 of 1.5 mm. The guide pins 6 supported by the diagonal beam members and the transverse beam members were housed in V-shaped grooves 7a at both ends.

Assembly of the guide pin jig was conducted in the following manner.

In the guide pin jig having the six beams to be established, the diagonal beam members were assembled first. Then, the assembled diagonal beam members and the vertical beam members were put together temporarily. Specifically, the diagonal beam members were temporarily fixed to the vertical beam members in such a manner that the guide pins, the V-shaped grooved substrates and the upper lid substrates of the diagonal beam members were brought into contact with the V-shaped grooved substrates of the vertical beam members, and simultaneously, the guide pins were temporarily fixed. Next, the transverse beam members were incorporated with the temporarily fixed diagonal beam members and vertical beam jigs. Specifically, temporary fixing was conducted so that the guide pin protruding from the diagonal beam members and the V-shaped grooved substrate and upper lid substrate of the transverse beam members provide a three-point contact. Finally, the assembly was fixed using an adhesive.

Figure 7:
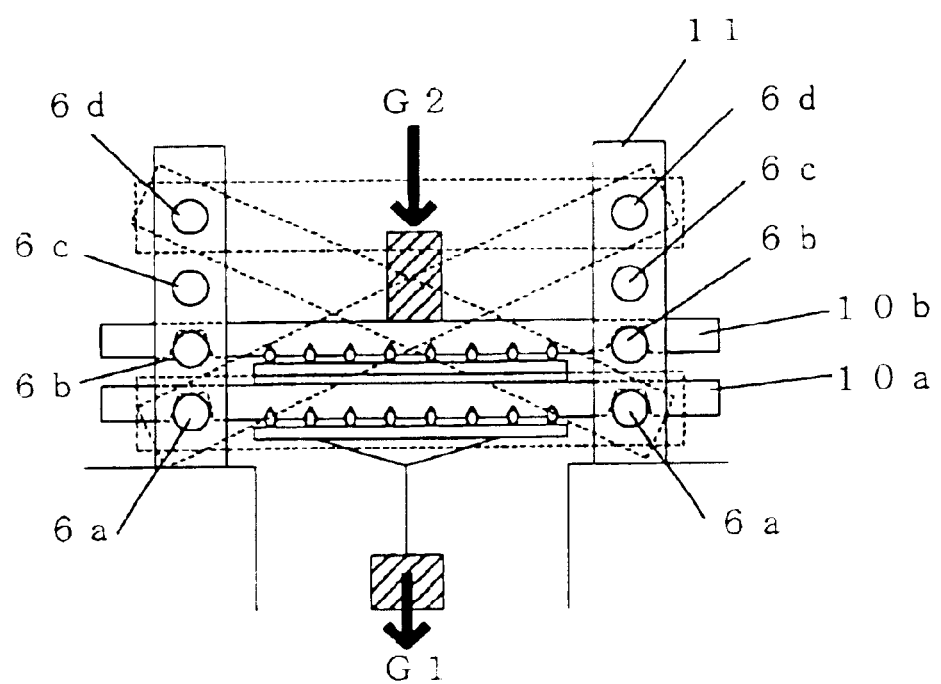
FIG. 7 illustrates one example of the method of manufacturing a two-dimensional optical connector component according to this invention, specifically, illustrates a method of assembling the two-dimensional optical fiber array.
Figure 8:
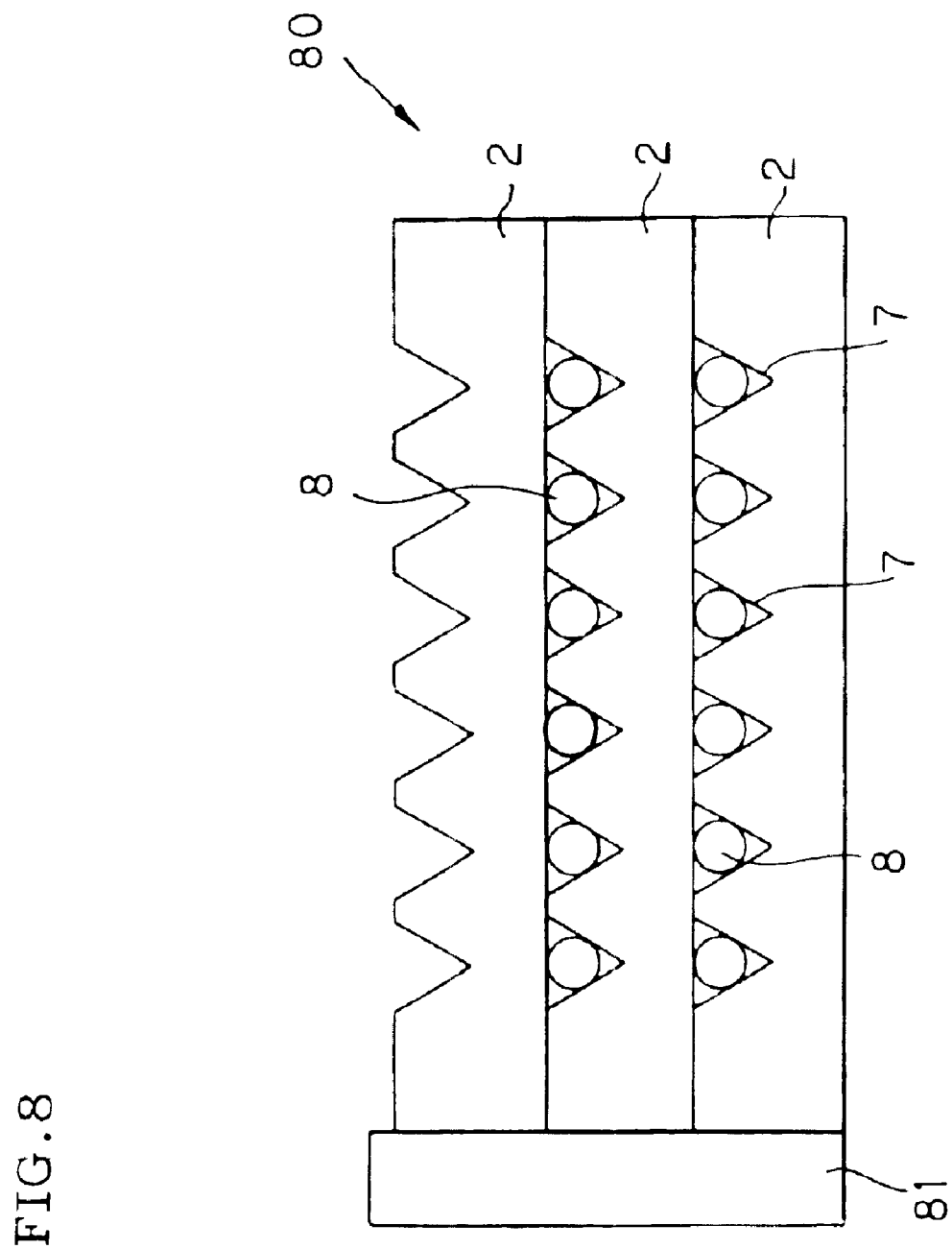
FIG. 8 is a cross-sectional view of a two-dimensional optical fiber array, illustrating one example of a conventional method of manufacturing a two-dimensional optical connector component.
Figure 9:
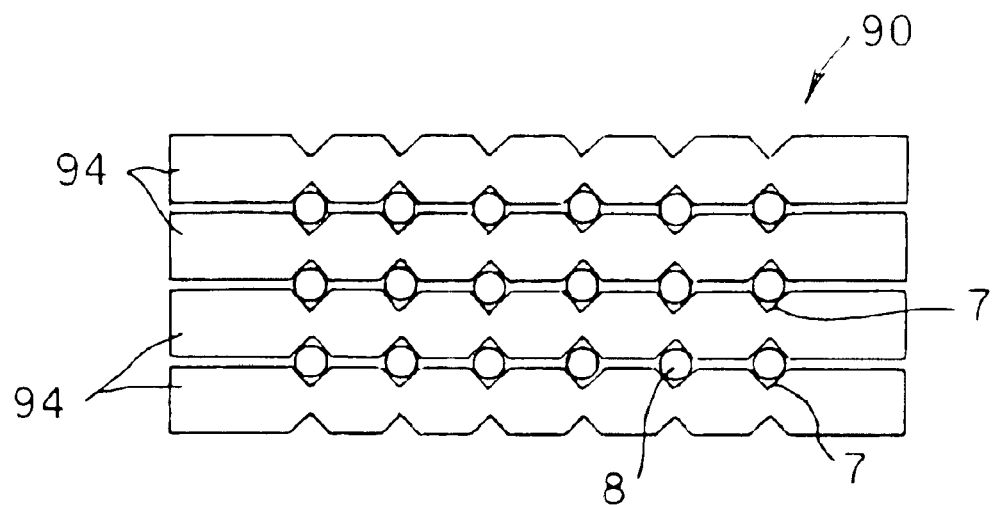
FIG. 9 is a cross-sectional view of a two-dimensional optical fiber array, illustrating another example of a conventional method of manufacturing a two-dimensional optical connector component.

Using the assembled guide pin jig, the FAs were stacked to form the 2DFA in the following manner. First, as shown in FIG. 7, a lowermost FA 10a was disposed between first guide pins 6a and second guide pins 6b, one each of which was provided on each of the two vertical beam members of the guide pin 11. Then, in order to assure contact between the guide pins and the guide grooves of the V-shaped grooved substrate of the FA, a load G1 was exerted on the FA 10a by pulling the same downwardly. Next, a second lowest FA 10b was disposed between the second guide pins 6b and guide pins 6c, and in order to assure contact between the guide pins and the guide grooves of the V-shaped grooved substrate of the FA, a load G2 was given to the FA 10b by pressing the same from above. In this state, an ultraviolet curing adhesive was spread between the FA 10a and the FA 10b, and irradiated with ultraviolet rays for curing. Here, since any adhesive flowing into the guide groove causes the guide pin to be fixed, the adhesive was carefully made to flow only between the V-shaped grooved substrate of the FA 10a and the upper lid substrate of the FA 10b. For third lowest and upper FAs, as in the case of the second lowest FA 10b, the FA was disposed between the guide pins, the load G2 was given thereto from above, and the FA was fixed with the adhesive. The same process was conducted to an eighth FA to provide a stack.

To show a relationship between the guide pins of the vertical beam members and the guide grooves of the FAs, the diagonal beam members and the transverse beam members are shown as a perspective view in FIG. 7.

Figure 6:
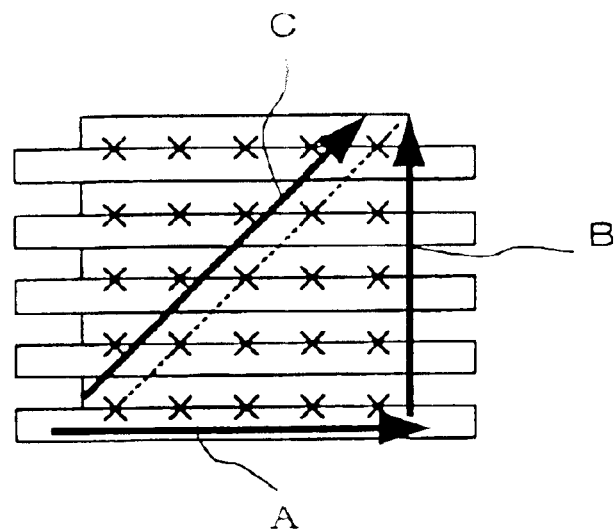
FIG. 6 is a diagram illustrating a method of measuring core positions of the two-dimensional optical connector component according to this invention.

Measurement of positions of stacked optical fiber cores (simply referred to as a core hereinafter) of the 2DFA was carried out in the following manner. First, core position measurement was conducted in the direction of an arrow A shown in FIG. 6, that is, positions of cores in each FA were measured. Next, core position measurement was conducted in the stacking direction indicated by an arrow B. Then, core position measurement was conducted in the diagonal direction indicated by an arrow C.

By combining data from the respective measurements, a core position shift from an ideal matrix was calculated.

COMPARISON EXAMPLE

A 2DFA of a FA stack type was fabricated as in the example except that the diagonal beam members were omitted, and the guide pin jig was composed of by four beams, that is, only the vertical beam members and the transverse beam members, and then, the core position shift was calculated.

The respective 2DFAs were thus fabricated. In the case of using the guide pin jig composed of four beams (Comparison Example), shifts from ideal core positions in the finished 2DFA were on the order of 15 μm. On the other hand, in the case of using the guide pin jig composed of six beams (Example), shifts from ideal core positions in the finished 2DFA were reduced to 2 μm or less.

In the examples mentioned above, a load was applied to an FA inserted between guide pins in order to keep guide pins in contact with the grooves provided in V-shaped grooved substrate by pulling FAs from the downside thereof. In the other words, the load was given thereto in the direction of gravitation, however, it is required to use a material having a high stiffness not so as to make the guide pins deflect when loaded. Therefore, an easier method for keeping guide pins contact with the grooves provided in V-shaped grooved substrate will be illustrated below.

Figure 11:
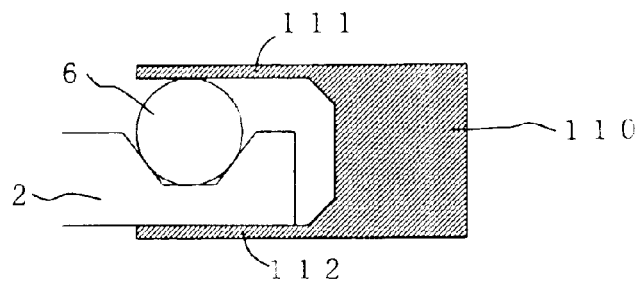
FIG. 11 is an exemplary front view of a double-pointed tack shaped guide pin jig according to this invention for showing a state where the double-pointed tack shaped guide pin jig pinches guide pins and one-dimensional optical connector components.
Figure 12:
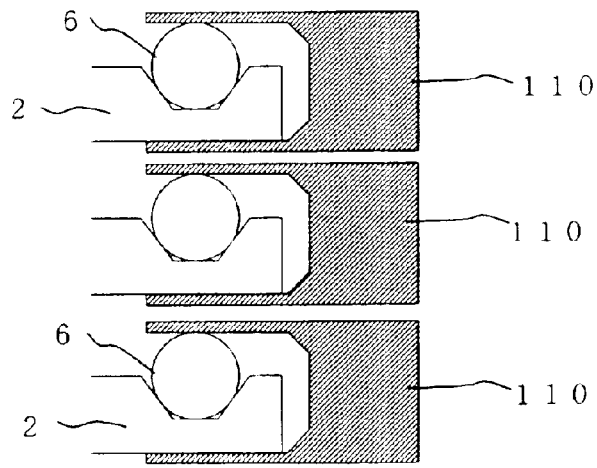
FIG. 12 is an exemplary front view of one embodiment under the practical use of a double-pointed tack shaped guide pin jig according to this invention showing a state where the double-pointed tack shaped guide pin jig pinches guide pins and one-dimensional optical connector components in three stacked layers.

The method is to keep guide pins contact with the grooves provided in V-shaped grooved substrate by loading guide pins and FAs in such a manner that both of them were pinched with a double-pointed tack shaped elastic jig, thereby the guide pins and the guide grooves are contact intimately each other. That is, this method may be achieved by using, as a double-pointed tack shaped elastic jig, a double-pointed tack shaped flat spring jig 10 shown in FIG. 11. As shown in FIG. 1, this double-pointed tack shaped flat spring jig has an upper jaw portion 111 and a lower jaw portion 1 12. The jig is a tool for keeping the guide pin 6 and the V-shaped substrate 2 of a one-dimensional optical connector component in contact by pinching them with the upper jaw portion 111 and the lower jaw portion 112.

In the case that this double-pointed tack shaped flat spring jig is used, firstly, a first one-dimensional optical connector component having guide grooves at both ends is prepared. Then the thus prepared component is inserted into first guide pins of the guide pin jig. Thus, the guide pins and the guide grooves of a one-dimensional optical connector component are made to contact intimately. Next, a second one-dimensional optical connector component having guide grooves at both ends is prepared. Then the thus prepared component is inserted into second guide pins of the guide pin jig. Thus, the guide pins and the guide grooves of a one-dimensional optical connector component are made to contact intimately. Thereafter, an adhesive is injected into the space between the first one-dimensional optical connector component and the second one-dimensional optical connector component, and is hardened. A two-dimensional optical connector component comprising a plurality of one-dimensional optical connector components stacked precisely with each other may be produced by repeating the above-mentioned procedure, as required.

The double-pointed tack shaped flat spring jig comprises at least an upper jaw portion and a lower jaw portion, and it may use a flat spring. It is preferable to use SUS steel, carbon steel, spring steel, beryllium copper or the like as a material for producing this jig, in view of Young's modulus.

Various embodiments may be thought out as a practically usable double-pointed tack shaped flat spring jig. The case where three one-dimensional optical connector components are stacked is shown in FIG., 12 as an example. The stacking may be carried out by installing this type of a double-pointed tack shaped flat spring jig one by one in the same position of the respective layers in the depth direction thereof in the case that a sufficient space between the guide pin 6 and the V-shaped grooved substrate of a one-dimensional optical connector component is secured.

Figure 13A:
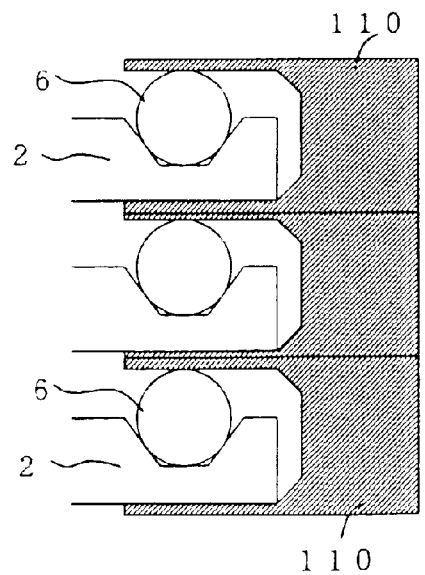
FIGS. 13(a) and (b) are exemplary views of another embodiment under the practical use of a double-pointed tack shaped guide pin jig according to this invention.
Figure 13B:
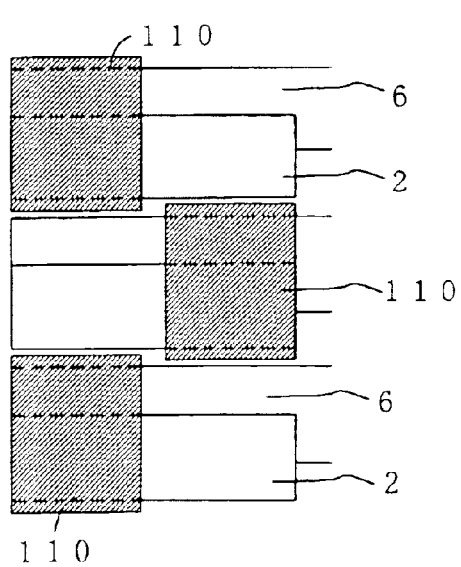
FIG. 13(b) is a side view showing a state where the double-pointed tack shaped guide pin jig pinches guide pins and one-dimensional optical connector components in three stacked layers.

FIGS. 13(a) and 13(b) show another example wherein three one-dimensional optical connector components are stacked. FIG. 13(a) is a front view and FIG. 13(b) is side view thereof. As shown in these figures, one may install alternately this type of a double-pointed tack shaped flat spring jig in the case that a sufficient space between the guide pin 6 and the V-shaped grooved substrate of a one-dimensional optical connector component is not secured.

Figure 14A:
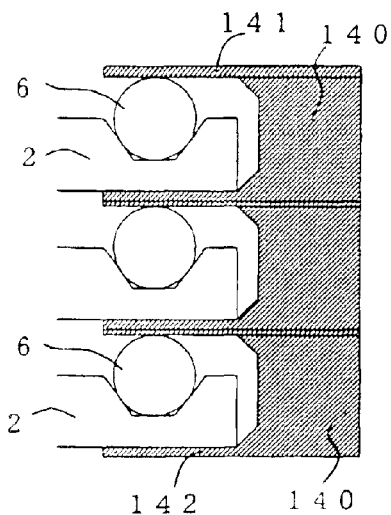
FIGS. 14(a) and (b) are exemplary views of still another embodiment under the practical use of a double-pointed tack shaped guide pin jig according to this invention.
Figure 14B:
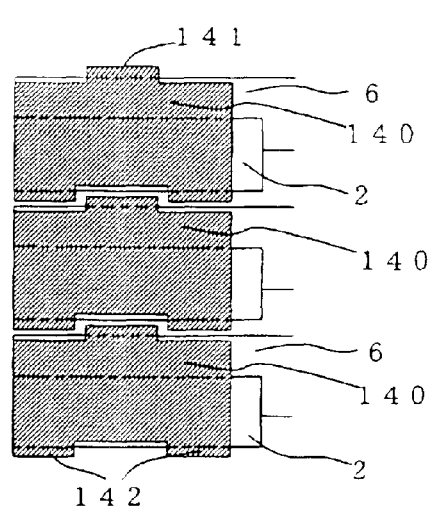
FIG. 14(b) is a side view showing a state where the double-pointed tack shaped guide pin jig pinches guide pins and one-dimensional optical connector components in three stacked layers.

If installing a double-pointed tack shaped flat spring jig alternately in the front end and rear end of the V-shaped grooved substrate, as shown in FIGS. 13(a) and 13(b), is problematic, one may use a double-pointed tack shaped flat spring jig 140 shown in FIGS. 14(a) and 14(b). In case of this jig 140, one may stack a plural number of the jigs by mating the concave portion of an upper jaw portion 141 of one jig and the convex portion of a lower jaw portion 142 of another jig, as can be seen clearly in FIG. 14(b). Therefore, this type of a double-pointed tack shaped flat spring jig may be used by installing it one by one in the same position of the respective layers in the depth direction even under such a condition that a sufficient space between the guide pin 6 and the V-shaped grooved substrate of a one-dimensional optical connector component is not secured.

As described above, according to the method of manufacturing a two-dimensional optical connector component of this invention, the optical connector components, such as the FA, can be stacked with high precision. Consequently, this invention advantageously facilitates construction of an optical transmission system with high density, and contributes to further construction and increased use of an optical transmission system and to development of an information society.

What is claimed is:

1. A method of manufacturing a two-dimensional optical connector component by stacking a plural number of one-dimensional optical connector components using at least four parallel disposed guide pins, wherein positions of said guide pins are determined by at least five pieces of beams including at least one diagonal beam.

2. The method of manufacturing a two-dimensional optical connector component according to claim 1, wherein at least two of said beams are composed of at least one of said one-dimensional optical connector components.

3. The method of manufacturing a two-dimensional optical connector component according to claim 1, wherein at least one of said one-dimensional optical connector components is positioned with four parallel guide pins.

4. The method of manufacturing a two-dimensional optical connector component according to claim 3, wherein said positioning is in a stacked direction of said one-dimensional optical connector components.

5. The method of manufacturing a two-dimensional optical connector component according to claim 1, wherein at least one of said one-dimensional optical connector components is mounted with an optical medium having a substantially cylindrical shape.

6. The method of manufacturing a two-dimensional optical connector component according to claim 1, wherein at least one of said one-dimensional optical connector components is provided with guide grooves for fixing said guide pins.

7. The method of manufacturing a two-dimensional optical connector component according to claim 1, wherein said two-dimensional optical connector component is a two-dimensional optical fiber array.

8. The method of manufacturing a two-dimensional optical connector component according to claim 1, by using a guide pin jig having said at least five pieces of beams and said at least four parallel disposed guide pins; said beams including two vertical beam members and two transverse beam members configured in a parallel cross and two diagonal beam members provided diagonally across said parallel cross, the two vertical beam members at the minimum, and said two vertical beam members each having a plurality of guide pins provided at desired positions thereon, wherein said method includes (a) preparing a plurality of one-dimensional optical connector components each having guide grooves for fixing the guide pin at both ends thereof, (b) inserting a first one-dimensional optical connector component into said guide pin jig so that said guide grooves are made to contact with the respective first guide pins provided on said two vertical beam members and applying a load on said first one-dimensional optical connector component to make the guide grooves and the guide pins contact intimately with each other;

(c) inserting a second one-dimensional optical connector component into said guide pin jig so that said guide grooves are made to contact with the respective second guide pins provided on said two vertical beam members and applying a load on said second one-dimensional optical connector component to make the guide grooves and the guide pins contact intimately with each other;

(d) injecting an adhesive into a space between said first one-dimensional optical connector component and said second one-dimensional optical connector component and curing the adhesive, and (e) repeating steps (c) and (d) to stack the plurality of one-dimensional optical connector components until a predetermined number of the one-dimensional optical connector components is stacked.

9. The method of manufacturing a two-dimensional optical connector component according to claim 8, wherein said load is applied to said first one-dimensional optical connector component in a direction of gravitation thereof.

10. The method of manufacturing a two-dimensional optical connector component according to claim 8, wherein said load is applied to said first one-dimensional optical connector component in a direction in which the guide pins and said first one-dimensional optical connector component are pinched.

11. The method of manufacturing a two-dimensional optical connector component according to claim 10, wherein said load is applied to said guide pins and said first one-dimensional optical connector component by a double-pointed tack shaped elastic jig.

12. The method of manufacturing a two-dimensional optical connector component according to claim 8, wherein at least said first one-dimensional optical connector component is provided with an optical medium having a substantially cylindrical shape between the guide grooves at both ends, and said adhesive is an ultraviolet ray curable adhesive; and said method includes the steps of injecting said adhesive into a space between said first one-dimensional optical connector component and said second one-dimensional optical connector component and curing the adhesive with ultraviolet rays applied to said optical medium.

13. A guide pin jig usable for manufacturing a two-dimensional optical connector component by stacking a plural number of one-dimensional optical connector components, wherein said guide pin jig is provided with at least four pieces of parallel disposed guide pins, and a position of said guide pins is determined by at least five pieces of beams including at least one diagonal beam.

* * * * *